Aug. 28, 1962 R. HARDING, JR 3,051,785

HIGH SPEED RECORDING APPARATUS

Filed May 28, 1957 3 Sheets-Sheet 1

INVENTOR
ROBERT HARDING, JR.
BY
Robert Harding Jr.
ATTORNEY

Aug. 28, 1962 R. HARDING, JR 3,051,785

HIGH SPEED RECORDING APPARATUS

Filed May 28, 1957 3 Sheets-Sheet 2

INVENTOR

ROBERT HARDING, JR

BY *Robert Harding Jr.*

ATTORNEY

Aug. 28, 1962 R. HARDING, JR 3,051,785

HIGH SPEED RECORDING APPARATUS

Filed May 28, 1957 3 Sheets-Sheet 3

INVENTOR
ROBERT HARDING, JR
BY
Robert Harding Jr.
ATTORNEY

United States Patent Office 3,051,785

Patented Aug. 28, 1962

3,051,785

HIGH SPEED RECORDING APPARATUS

Robert Harding, Jr., Briarcliff Manor, N.Y., assignor to International Telephone and Telegraph Corporation, New York, N.Y., a corporation of Maryland Filed May 28, 1957, Ser. No. 662,275
9 Claims. (Cl. 178—23)

This invention relates to high speed recording apparatus and especially to such apparatus arranged to record characters on a record medium, such as a tape, which is fed through the apparatus. It is applicable to mechanical printing devices as well as to recording apparatus having no moving parts.

It is one of the objects of the invention to provide a high speed recording apparatus in which a plurality of different characters may be recorded on a record medium in selected sequence combinations without shifting the character-recording devices in the apparatus but depending on the movement of the record medium through the apparatus for the proper placement of the various characters on the record medium.

In mechanical printers, it is usually the custom to move the printing blank, such as a tape, into a position with respect to a particular point where the type characters are to print, then move the particular element carrying a desired type character into position so that it can strike the printing blank. In some tape printers, the type elements have heretofore been arranged on a wheel and the wheel spun around until the desired type element is adjacent the printing blank, then either the whole type wheel is moved towards the printing blank to cause the desired element to strike the blank or the printing blank is moved towards the type element. In ordinary commercial typewriters, the type elements are arranged on levers, so positioned and fulcrumed that each type element swings from its normal position through an arc and strikes the printing blank at a predetermined point which is the same for each type element, the printing blank being shifted as the type elements are selected and caused to strike the blank.

It is another object of the present invention to eliminate the necessity of the type wheel in a mechanical printer of the tape printing type or the swinging of the type element through a long arc as in the ordinary typewriter.

Another object of the invention is to provide a recording apparatus in which the recording elements are mounted in a row, each element being arranged to record at the point where it is mounted as a record medium is moved past it parallel to the row, the operation of each recording element to record on the record medium being delayed after the apparatus has received the direction to record the character carried by that element for a period of time necessary for the record medium to move until a particular point on the record medium where it is desired to record a particular character, reaches the recording element of that character.

Another object of the invention is to provide a high speed printer in which the printing of each character occurs at the point where the element carrying that character is positioned, the printer having a memory device or devices by means of which the action of printing elements against the printing blank will be delayed until such time as the point on the printing blank where it is desired to print a particular character has reached the element carrying that character in its movement through the machine.

Still another object of the invention is to provide a high speed photographic recording apparatus in which the characters to be recorded are arranged in a row and each is provided with a light source so as to project an image of the associated character on a sensitized tape as the tape is moved parallel to the row of characters through the apparatus, the exposure of each character taking place at the point where that character is positioned, the apparatus having a memory device or devices by means of which the operation of a light source associated with a character will be delayed after the act which initiates the recording of that character has taken place until such time as the point on the tape where it is desired to record such character has reached that character in its movement through the apparatus.

A feature of the invention is the provision of a straight row of equally spaced character-carrying elements with means for moving a tape in closely spaced relation with respect to said elements and parallel to the row thereof, means for causing each element to record its character independently on the tape, and means for delaying the operation of any particular element after a signal characterizing it has been received and for a time period corresponding to the distance that particular element is from a predetermined point aligned with said row of elements and spaced from such row in the direction opposite to the movement of the tape.

The above-mentioned and other features and objects of this invention and the manner of attaining them will become more apparent and the invention itself will be best understood by reference to the following description of two embodiments of the invention taken in conjunction with the accompanying drawings, in which.

Broadly the invention comprises a row of character-carrying elements, means for moving a record medium along the row of elements, parallel thereto and closely adjacent thereto, means for operating each of the elements so as to record its character on the record medium independently in response to an act or a signal characterizing that element, and delay means for delaying the operation of each element for a time corresponding to the time required for a particular point on the record medium where the character is to be recorded to move adjacent the element carrying that character.

Figure 1:
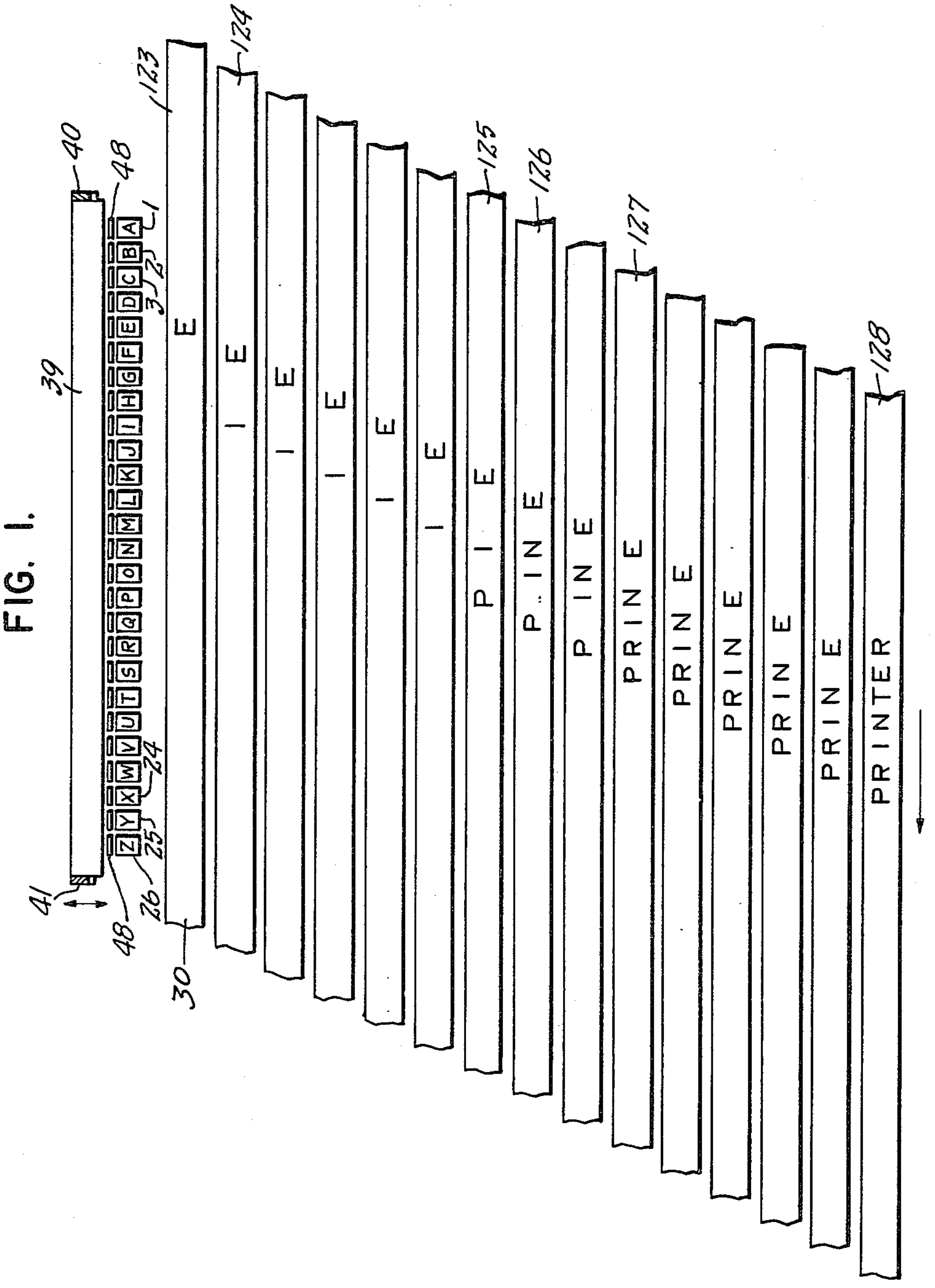
FIGURE 1 is a diagrammatic chart showing a tape moving through a recording apparatus, in this case illustrated as a printer, in a succession of steps to illustrate the operation of the printer.
Figure 2:
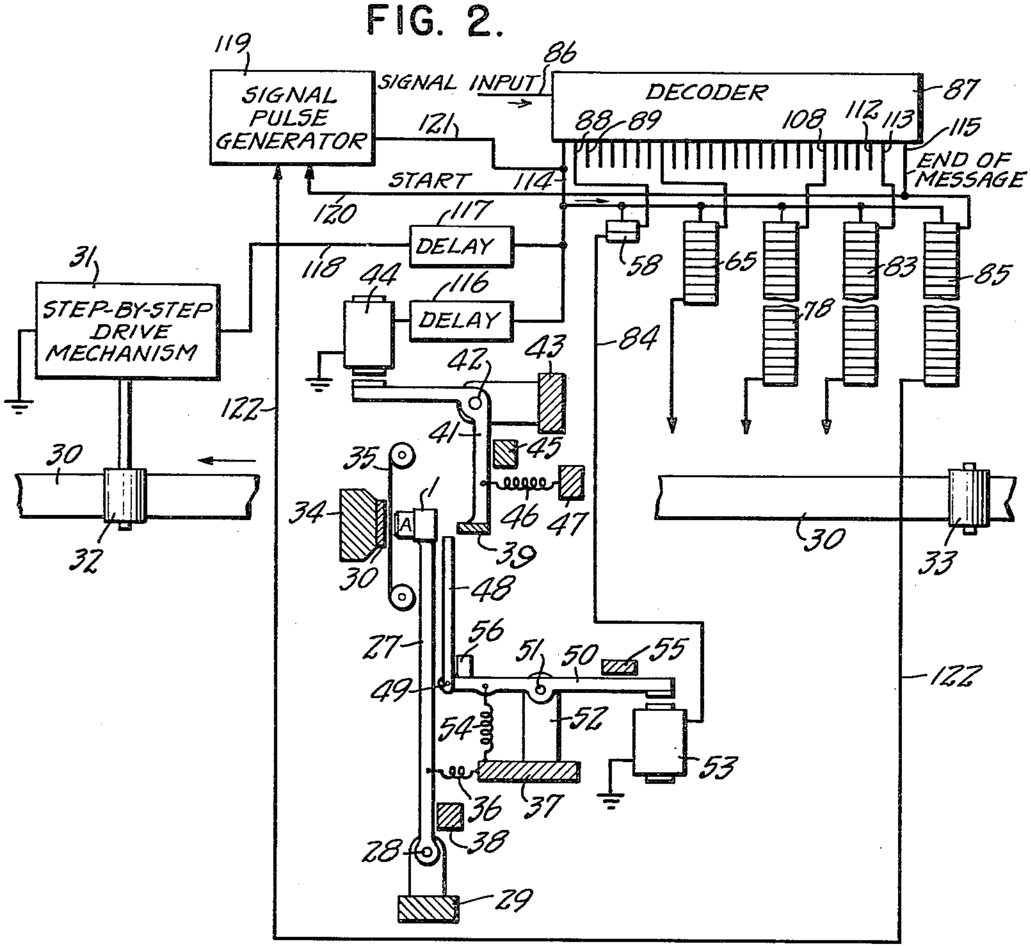
FIGURE 2 is a diagrammatic representation of the mechanical printer, showing in detail the operation of one type element and the element operating bail.

Referring to FIGURES 1 and 2 of the drawing which illustrate a mechanical printer, the type elements 1–26, representing the alphabet, are arranged in a straight row, as shown in FIGURE 1 with equal spacing between elements. Each element is mounted for independent limited movement, and one form of such mounting is illustrated in FIGURE 2 in which the element 1 carrying the type letter "A" is shown. Any desired number of type elements may be used, but for purposes of illustration only those carrying the letters of the alphabet have been shown. Since all of the type elements are similarly mounted, only the mounting arrangement for element 1 has been illustrated.

The type element 1 is mounted for limited movement transverse to the row of type elements, such as by mounting it on the end of a lever 27, the other end of which is pivoted, as at 28, on a rigid part of the frame, as indicated at 29. The tape 30 is mounted parallel to the type elements and closely adjacent these elements and is arranged to be moved step-by-step by a drive mechanism 31 which is shown as driving suitable rollers or sprockets 32 by means of which the tape is drawn through the machine. Rollers 33 are shown supporting and guiding the other end of the tape. The tape is caused to slide in its movement along a backing member 34 which extends the full length of the row of type elements. An ink ribbon 35 may be provided between the tape and the type elements in order to print the character carried on a type element when the type element is moved towards the tape and the ribbon is pressed between the character and the tape, in accordance with a well-known arrangement for printers. The inked ribbon may also be moved either at the same speed as the tape or at a different speed by a mechanism not shown.

When the lever 27 is swung towards the ribbon and type element in FIGURE 2, the type element will compress the ribbon between the type character carried thereby and the tape to make an impression on the tape. Means, such as the spring 36, is provided connected between the lever 27 and a fixed portion of the machine, indicated at 37, to urge the lever 27 in a clockwise direction. A stop member 38 is also provided to prevent the lever 27 from swinging beyond a predetermined position towards the right.

On the other side of the type elements from tape 30, I provide a bail 39 which extends parallel to the row of type elements and is spaced a short distance therefrom, as shown in FIGURES 1 and 2. This bail may be mounted on a pair of bell crank levers 40 and 41 which are pivoted, as at 42, from fixed portions of the machine, indicated at 43. The other end of at least one bell crank lever 41 forms an armature which is controlled by an electromagnet 44, the magnet being positioned in such a manner that energization of the magnet will cause the bell crank levers 40 and 41 to rotate in a clockwise direction about their pivots, thus causing the bail 39 to move in the direction of the type elements. The arrangement is such that the movement of the bail 39, caused by the energization of the magnet 44, is not sufficient to strike the type elements. A stop member, as indicated at 45, is provided for each of the bell crank levers to prevent the bail 39 from moving to the right beyond the position shown in FIGURE 2. Resilient means, such as a spring 46, is provided for each bell crank lever, connected between the bell crank and a fixed portion 47 of the machine to urge the bail 39 normally towards its limit of movement away from the type elements.

In order to cause a selected one or more of the type elements to move against the ribbon to print the character or characters carried thereon when the bail 39 is moved in the direction of the type element, I provide a plurality of independently separate operating fingers 48, there being one for each type element. These operating fingers are mounted in a row, as indicated in FIGURE 1. The finger 48 is shown in FIGURE 2 in its normal position with its upper end just below the bail 39, so that the bail will not strike it. The lower end of the finger 48 may be pivoted at 49 on a lever 50 which in turn may be pivoted at a point 51 between the ends thereof on a fixed member 52 of the printer, shown mounted on the fixed portion 37. The other end of the lever 50 is acted upon by an operating finger magnet 53, which is energized in a manner to be described later. The lever 50 is held in its normal position by means of a spring 54 which may be connected between the end of the lever adjacent the pivot 49 and the fixed portion 37, a stop member 55 being provided to prevent the lever 50 from rotating counterclockwise beyond the position shown.

When the operating finger magnet 53 is energized, the lever 50 is rotated in a clockwise direction, thus causing the operating finger 48 to move upwardly, so that it becomes interposed between the type element and the bail 39. When the finger is in this position and the bail 39 is moved towards the type element, the bail will strike the operating finger and cause the operating finger to pivot about its pivot point 49 and to strike the type element and drive it towards the tape with the ink ribbon between it and the tape. The operating finger is prevented from moving too far to the left by the type element itself and it is prevented from pivoting too far to the right by a stop member 56 which may be formed as a portion of the lever 50.

It will be understood that each type element has its own supporting lever and its own operating finger and operating finger magnet, while there is one bail 39 common to all of the type elements and operated by either one or two bail magnets 44. The bail is caused to move each time an act initiating the printing of a character is performed, but it will be understood that when it is so moved only those type elements which have operating fingers interposed between themselves and the bail will be caused to print. Any number of type elements may print at the same time.

In order to provide the delay between the act initiating the printing of a character and the time when the type element is required to print the character on the tape, I provide some kind of a delay means, as for example, the pattern registers 58–83, only four of which 58, 65, 78 and 83 are shown in FIGURE 2. There is one of these pattern registers for each of the type elements. These pattern registers may be similar to that described in the U.S. Patent No. 2,649,502 in which a plurality of gaseous discharge gaps are arranged so that a succession of pulses applied to a first input circuit will cause the pattern produced by a combination of the gaps which are discharging to step along in succession. A second input for each pattern register is used to produce a first discharge in a rest element thereof and an output circuit is connected to the last gap to produce an output signal when the last gap is discharging. A pulse received on the second input will set the rest gap; the next pulse on the first input will step the register one step.

The pattern registers 58–83 have successively increasing numbers of gaps. The pattern register 58 may have only one gap in addition to its rest gap, while each successive pattern register contains one gap more than the preceding register.

The output connection for the pattern register 58 is connected by means of the wire 84, to the operating finger magnet 53, and the output connections from the remaining pattern registers are connected in a similar manner to corresponding finger magnets, not shown.

In addition to the pattern registers 58–83, another pattern register 85 is provided which has a number of gaps at least equal to the number of gaps in the pattern register 83. This pattern register 85 is used for a purpose to be later described.

The printer may be actuated by keys or by signals from a distant source. An arrangement adapted to respond to such signals has been shown in FIGURE 2.

Signals enter the apparatus over the input lead 86 and are fed into a decoder 87. The signals may be in any desired code, as for instance, a five-element code, each five elements received in succession representing a particular letter or character on one of the type elements. The decoder 87, which forms no part of the present invention, may be any well-known type of decoder which will translate the coded signals into a single signal or potential applied to a particular one of a plurality of conductors 88–113 which represent, respectively, the type elements 1–26, carrying letters A–Z. These conductors are connected respectively to the second inputs of the corresponding pattern registers 58–83. Whenever a signal appears on one of the conductors 88–113, the rest gap of the corresponding pattern register 58–83 will be caused to discharge.

In addition to the conductors 88–113, there are two conductors 114 and 115, the former being arranged to deliver a signal simultaneously with a signal received on any of the conductors 88 to 113 and the latter being arranged to deliver a signal in response to an "end-of-message" signal which will appear on the input lead 86 at the end of a message. The purpose of the conductors 114 and 115 will be described later.

When a signal representing, for example, the letter "A," arrives on the input lead 86, the decoder 87 will translate that signal into a pulse or potential on the conductor 88, so that it is delivered to the pattern register 58 to cause the rest gap to discharge. At the same time, when this signal, representing the letter "A," is applied to the conductor 88, a signal will appear on the conductor 114 which will be delivered to the first input of all of the pattern registers. None will step, however, since none had been previously set. But at the next signal on the lead 114, since the pattern register 58 has its rest gap discharging the discharge will make one step to the next gap, which, in this case, is connected to the output circuit for the pattern register, so that a potential will be applied over the conductor 84 to operate the operating finger magnet 53 and thus cause the finger 48 to move between the type element 1, which carries the letter "A," and the bail 39.

The potential on the conductor 114 is also delivered to a delay circuit 116 which provides a sufficient delay to permit the finger 48 to reach the limit of its movement, whereupon the potential from the delay circuit 116 is delivered to the bail operating magnet 44 to cause the bail 39 to move towards the tape 30, so that it strikes the operating finger 48 and moves the finger, together with the type element 1, forcing the type element against the ribbon 35 to impress the letter "A" on the tape 30.

The potential on the conductor 114 also is applied to a delay circuit 117 which provides a delay greater than that of the delay circuit 116, whereupon a potential is delivered over the conductor 118 to the step-by-step drive mechanism 31 for the tape 30 after the letter has been printed, thus causing the drive mechanism to move the tape one step in the direction of the arrow, which step is equal in length to the distance between the type elements.

If the next signal, following that of the letter "A," is a signal representing the letter "H," the conductor 95 will receive a potential and a discharge will be set up in the rest gap of the pattern register 65. The pattern register 65 will then step each time successive signals are received, but no signal will appear on the output until eight additional steps have been taken, since there are eight gaps in the register in addition to the rest gap. Since the same signals will cause the step-by-step drive mechanism 31 for the tape to step the corresponding number of steps, the tape having "A" printed on it will move to a position just beyond the position occupied by the type element 8 which contains the letter "H," The movement of the bail will then cause the letter "H" to be printed next to the letter "A."

Each pattern register will, therefore, be controlled by a signal representing the corresponding letter, and the pattern will shift along the register step-by-step as the successive signals are received.

After the end of a message, there will still be signals stored in the various pattern registers which have not yet operated their corresponding finger magnets. Therefore, the pattern registers must continue to shift step-by-step until the last pattern register having the greatest number of steps has completed its cycle. In order to provide continued stepping after the end of a message has been received, I provide a signal pulse generator 119 which may be of a well-known type, such as a multivibrator, arranged to produce a succession of spaced pulses in response to a start signal and to continue the production of these pulses until stopped by a suitable stop signal. To this end the signal pulse generator 119 has its start input connected over a conductor 120 to the "end-of-message" conductor 115 from the decoder 87. When an "end-of-message" signal is received, the conductor 115 is energized and will start the signal pulse generator 119 producing a succession of pulses which are delivered over a conductor 121 to the conductor 114. These pulses will then operate all of the pattern registers, as well as the bail and step-by-step mechanism for the tape, in the same manner that signals arriving over the input lead 86 carry on these functions, as already described.

The "end-of-message" signal from the conductor 115 also produces a discharge in the rest gap of the pattern register 85 and this register will step under control of the signal pulse generator, similarly to the other pattern registers. When the discharge reaches the last gap of the pattern register 85, a signal will be delivered over the conductor 122 to the signal pulse generator which will stop the operation of the generator. Since the pattern register 85 has at least as many gaps as the pattern register 83, when the signal on the conductor 122 is received, the signals stored in the other pattern registers will all have been delivered to their corresponding operating finger magnets.

Figure 3:
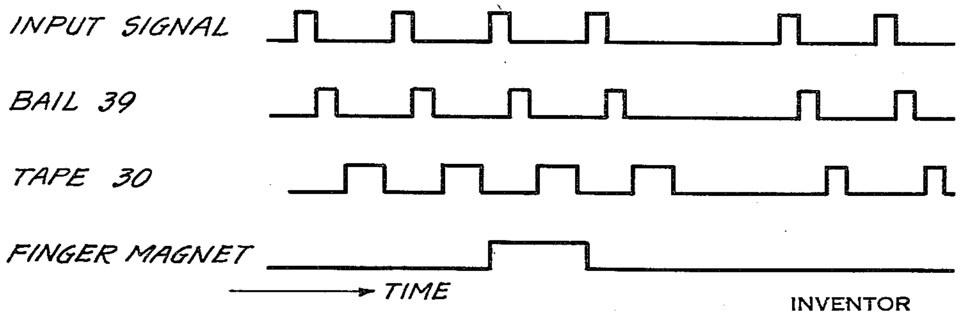
FIGURE 3 is a timing chart showing the time during which various members of the printer are operated.

The timing of the operation of the tape, the finger magnets and the bail with respect to the input signals received on conductors 88 to 115 is illustrated in FIGURE 3 where time is represented along a horizontal line and the operating times for the signal and moving parts are indicated in successive horizontal rows.

In order more fully to understand the operation of the printer, reference is made to FIGURE 1 wherein the tape has been represented in a series of successive positions during the printing of the word "PRINTER," the first position of the tape, indicated at 123, representing the position attained some time after the entire word has been received, as will be explained.

The letter "P" is first received by the decoder. On the receipt of the signal, the pattern register, corresponding to that letter is set. The bail 39 will operate at a slightly later time, but no printing is done because there is no operating finger in position between the bail and the type elements. At a slightly later time, the tape will move one step. The next signal to be received will represent the letter "R," and the sequence of events already described will be repeated with the exception that the pattern register, corresponding to the letter "R," will be set. Again there will be no printing. The next signal to be received will represent the letter "I" which causes the same sequence of events to occur, except that the pattern register, corresponding to the letter "I," will be set. The next signal to be received will represent the letter "N," and this causes the same sequence of events to occur, except that the pattern register, corresponding to the letter "N," will be set. Nothing has been printed on the tape as yet, since no fingers have been moved into position. The next signal to appear will represent the letter "T." The same sequence of events, as occurred previously, will now be repeated, with the exception that the pattern register corresponding to the letter "T" will be set. The next signal to be received represents the letter "E" and the same sequence of events will occur, with the exception that now the pattern register corresponding to the letter "E" will be set. The next signal to be received will represent the letter "R" and the decoder will cause the pattern register, corresponding to the letter "R" to be set.

Nothing has been printed as yet, since none of the pattern registers has produced an output. Yet the end of the message has been reached and the "R" is therefore followed by an "end-of-message" signal which will start the signal pulse generator 119. Pulses from the signal pulse generator will then continue the stepping of the registers and the tape.

Four steps will now be taken by the pattern registers and the tape before the register, corresponding to the letter "E," will produce an output. At this time the tape will be in the position indicated at 123. This position is the result of eleven steps of the tape under control, first of the received signal, and then of the signal generator.

The pulse from the register, corresponding to the letter "E," will operate the corresponding operating finger magnet 53 and the associated operating finger 48 will move into position between the bail 39 and the type element 5, and when the bail operates, the letter "E" will be printed.

The tape then makes one step (step No. 12) to the position, indicated at 124 in FIGURE 1. The pattern registers have also made one step, and at this time the pattern register, representing the letter "I," is at its tenth position and will produce a pulse which will operate the operating finger, corresponding to the type element 9, carrying the letter "I," causing this element to print an "I" on the tape when the bail operates. The "I" will thus be positioned on the tape three steps in front of the letter "E" which has already been printed.

The tape will then make five more steps under control of the pulse signal generator before anything else happens. This will place it in the position indicated at 125 in FIGURE 1 which is its seventeenth step. At this time the pattern register, corresponding to the letter "P," will produce a pulse (its seventeenth pulse) which will raise the operating finger associated with the type element 16, carrying the letter "P," and when the bail moves, the letter "P" will be printed on the tape two steps ahead of the letter "I."

When the tape has taken another step (its eighteenth) it assumes the position indicated at 126. At this position, the pattern register, representing the letter "N," will have made fifteen steps and will produce a signal which will raise the operating finger associated with the type element carrying the letter "N," and the letter "N" will be printed on the tape one step behind the letter "I" and two steps ahead of the letter "E."

The tape will then make two steps with no change, when it will assume the position indicated at 127 at its twentieth step. At this time the pattern register, corresponding to the letter "R" will be at its nineteenth step and will produce a signal which will operate the operating finger, associated with the type element carrying the letter "R," and the letter "R" will be printed on the tape one step behind the letter "P" when the bail operates.

The tape will then make four more steps, making a total of twenty-four steps, with no further change. On the next step, the twenty-fifth, however, it will assume the position indicated at 128 in FIGURE 1. In this position, two of the pattern registers will produce signals, that representing the letter "T," which will be at its twenty-first step, and that representing the letter "R," which will be at its nineteenth step for the second "R" signal. Therefore, both operating fingers associated with the type elements carrying "T" and "R" will be raised, and when the bail moves again, both letters "T" and "R" will print, the letter "T" between the letters "N" and "E," already printed, and the letter "R" after the letter "E," so that in the position represented at 128, the entire word "PRINTER" will have been printed on the tape.

At this time the pattern register 85 will produce a pulse over the conductor 122 which will stop the signal generator 119. The entire apparatus will then remain quiescent until another message is received.

The reason that pattern registers are used instead of ordinary counters is that there may be more than one signal on a register at the same time. This is the case of the pattern register corresponding to the letter "R" in the example given above when the second and seventh signals are both "R" and the register produces an output at both the twentieth and twenty-fifth steps of the tape. Any repetition of the same letter before the completion of a cycle of the register 85 would require the pattern register function.

The spacing between type elements is limited only by the size of the mechanical equipment necessary to operate the operating fingers, and can be much greater than is indicated in FIGURE 1. It is only necessary to cause the tape to move a distance corresponding to the type element spacing each time it steps and to synchronize the stepping of the pattern registers with the steps of the tape.

Since the type elements only have to move a small fraction of an inch to print the characters and the operating fingers only have to move a small fraction of an inch to be interposed between the bail and type elements, the apparatus can be run at high speed.

Figure 4:
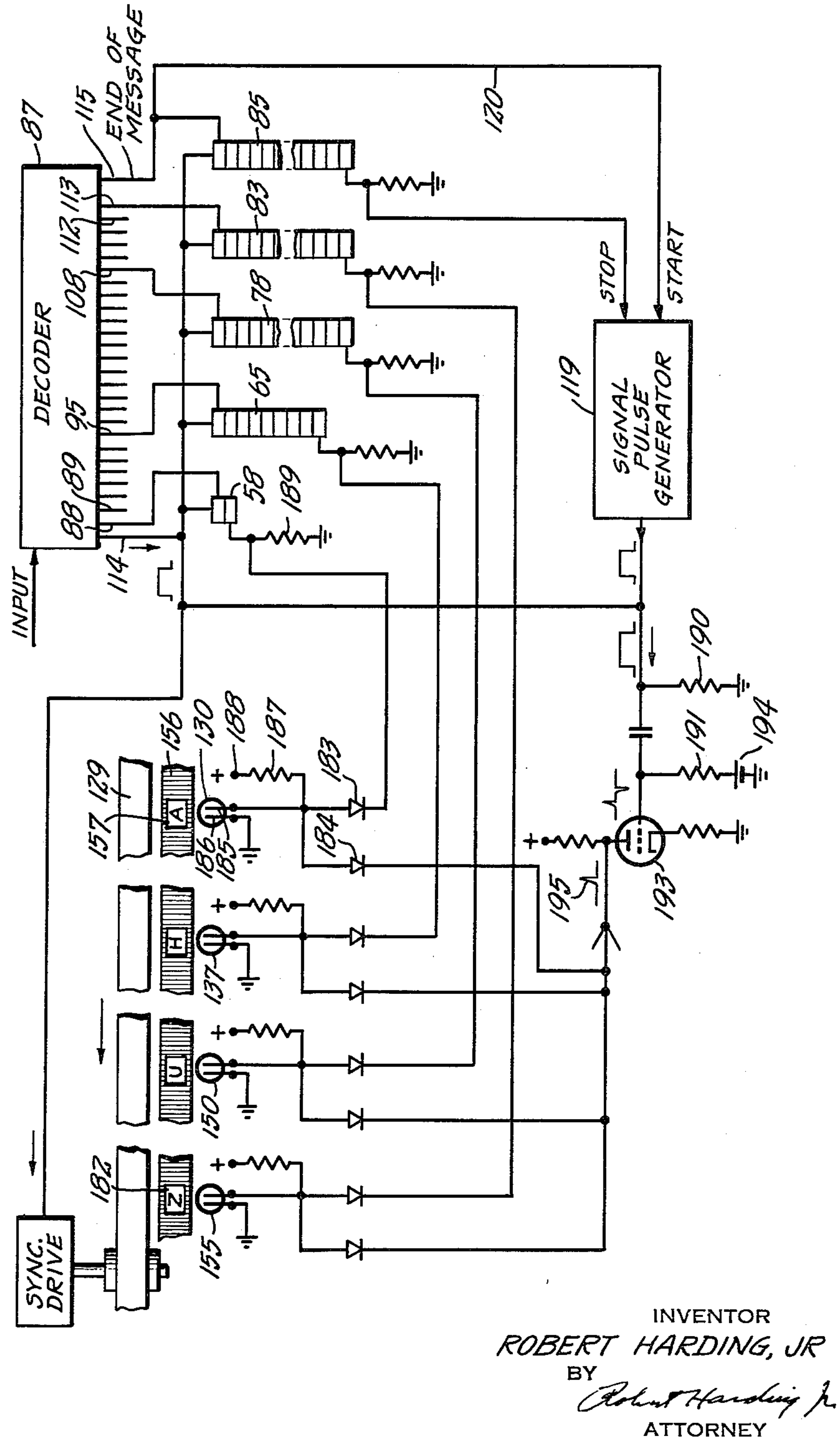
FIGURE 4 is a diagrammatic representation of another embodiment of the invention which is entirely electronic, having no moving parts save those required for moving the record medium through the apparatus.

The arrangement disclosed in FIGURES 1 and 2 uses mechanical type bars and associated mechanical parts and operates on a step-by-step basis. While such a mechanism may speed up the action of a mechanical printer, it is, of course, limited in its speed by the time required for the various moving mechanical members to shift their positions. In FIGURE 4 I have shown a system in which all moving parts have been eliminated except for the record medium 129 which, in this case, is a tape coated with a photographic emulsion, so that it will be sensitive to light images projected thereon. A row of light sources, such as gas discharge lamps 130–155, are provided in place of the type elements of FIGURES 1 and 2, the lamp 130 representing the letter "A," the lamp 137 representing the letter "H," the lamp 150 representing the letter "U," and the lamp 155 representing the letter "Z." The lamps are arranged in a row and the tape 129 is mounted parallel to the row of lamps and caused to be drawn through the machine at a speed which is related to the rate at which the incoming signals are received. This speed must be such that the tape will move a distance between incoming signals at least equal to the desired spacing between characters of the recorded message, as will be explained later.

Between the tape and the row of lamps is an opaque plate 156 which is provided with a plurality of windows 157–182, each corresponding to one of the characters to be recorded and being positioned adjacent the associated lamp. Each window carries an image of the particular character, for example, A–Z, either as a black character on a translucent or transparent background or as a translucent or transparent character on a black background. Preferably the positioning of the tape is so close to the window and the window is so close to the lamp that no optical system is necessary, although projecting lenses may be provided, if desired.

The tape, lamps, and associated equipment, just described, are enclosed in a suitable light-tight box, not shown, so that the images of the letters can be photographically recorded on the tape in a manner well understood, and as the tape is drawn through the apparatus, the flash of a lamp will cause the letter associated with that lamp to be photographically recorded on the tape with a minimum of blurring, provided the flash of the lamp occupies a period of time very small with respect to the distance the tape moves during that period.

The arrangement of FIGURE 4 utilizes the same type of decoder 87, as is shown in FIGURE 2, and also the stepping registers 58–83 and 85 and the corresponding output conductors 88–115 from the decoder. Also the signal generator 119 is the same as that of FIGURE 2 and is connected to the end-of-message conductor by the conductor 120.

Each of the lamps 130–155 is provided with a coincidence gate circuit requiring two input signals to cause the lamp to discharge. These gates are identical and only that connected to the lamp 130 will be described. This gate comprises two unidirectional-current-carrying devices 183 and 184 having their positive electrodes connected to one electrode 185 of the discharge lamp 130. The other electrode 186 of this lamp is connected to ground. The electrode 185 of the lamp is also connected through a resistor 187 to a source of positive potential, indicated at 188. The unidirectional-current-carrying devices 183 and 184 may be crystal diodes or other types of rectifiers.

The stepping registers 58–83 and 85, as has already been explained, are comprised of a succession of discharge gaps, the output being obtained across a resistor in the cathode circuit of the last discharge gap. Thus, the cathode resistor 189 for the last gap of the stepping register 58 is shown in FIGURE 4. The cathode end of this resistor is connected to the negative terminal of the rectifier 183. It will be seen that normally current can flow from the source 188 through the resistor 187, the rectifier 183, and the resistor 189 to ground. The voltage drop across the resistor 187 is sufficient to prevent the lamp 130 from discharging. However, when the output gap of the stepping register 58 is discharging, there will be a positive potential on the cathode of this gap and consequently the rectifier 183 will be blocked. However, the rectifier 184 must also be blocked before the lamp can operate. The blocking of this rectifier is controlled by a sharp pulse which is produced in the following manner:

The conductor 114 is connected to a differentiating network comprising resistors 190 and 191 and capacitor 192, the output of which is delivered to the control grid of a triode 193. This tube is biassed by a battery 194 in series with the resistor 191 in order to maintain the control electrode sufficiently positive to maintain the triode 193 normally discharging. Thus the anode of the triode will be near ground potential and this anode is connected to the negative terminal of the rectifier 184, as well as to all of the corresponding rectifiers associated with the other lamps.

Every time a pulse is produced on the conductor 114 from the decoder 87, the forward edge of the pulse will produce a positive pip in the output of the differentiator 190—191—192 which will thus be applied to the control electrode of triode 193. Since the tube is already operating at or near the saturation point, no effect will be produced on the output circuit. The trailing edge of the pulse from the conductor 114 will produce a negative pip in the output of the differentiator 190—191—192 which will cause the tube 193 to shut off, thus momentarily raising the potential of the anode in a sharp positive pip, indicated at 195. This positive pip 195 causes the rectifiers 184 and all corresponding rectifiers to be blocked. Thus, the signal from the input or from the signal pulse generator, whichever the case may be, will cause the stepping registers to step and will cause any one or more of them which reach the last discharge gap to block the rectifier corresponding to rectifier 183 associated with it. The trailing edge of the same pulse will then apply the positive pip 195 to the other rectifiers corresponding to rectifier 184 and the coincidence of the blocking of these two rectifiers will cause the associated lamp to flash for the duration of the pip 195 and thus to record the corresponding character upon the moving tape 129.

When the end-of-message signal has been received, the stepping register 85 is set, as has already been described, and the signal pulse generator 119 is caused to start producing pulses which then continue the stepping of the registers and continue the production of the positive pips 195 to flash lamps which are prepared by the discharging of the last gap in the associated stepping registers.

If the letters of the entire alphabet were to be received in succession, beginning with "A" and ending with "Z," the recording would be accomplished successively in the same order as the letters were received. However, if the letters of the alphabet were received in reverse order, beginning with "Z" and ending with "A," then all the registers would reach their last positions one step after the "A" had been received and all the letters would be recorded simultaneously with a single operation of the bail 39 in FIGURES 1 and 2 or a single flash of all the lamps in FIGURE 4.

Although I have described the invention in connection with a particular type of stepping pattern register employing gas discharge gaps, for the memory or delay device, it will be understood that any type of pattern shift register may be used, such as one using magnetic cores, or a magnetic drum may be used with a track for each character and suitable recording and reading heads for each track. If the signal from the memory device is not sufficient to operate the operating finger magnets of FIGURE 2 or the lamps of FIGURE 4, amplifiers may have to be used to increase the effective current. It is to be clearly understood that this description is made only by way of example and not as a limitation to the scope of my invention as set forth in the objects thereof and in the accompanying claims.

What is claimed is:

1. A recording apparatus comprising an input circuit adapted to receive an unlimited succession of signals representing characters to be recorded, a row of record making units, each corresponding to a different one of said characters, means for supporting a record medium in close proximity to said row of units and parallel thereto, means responsive to the received signals for moving said record medium through said apparatus in a direction parallel to said row of units a distance equal to the space separating two adjacent record making units for each successive signal received, separate operating means for each unit for individually causing each of said units to record its character on said record medium in response to a signal received at said input circuit representing the character carried by said unit and delay means for each unit included in said last mentioned means for delaying a unit operating means for a period of time sufficient for a point on said record medium to reach said unit from a predetermined point at the end of said row positioned in a direction opposite to the direction of movement of said record medium, each delay means comprising means for storing energy received in response to a signal representing the particular record making unit associated with said delay means, means for releasing said energy after the record medium has moved a predetermined distance from the predetermined point and for feeding said energy to the associated unit operating means, and means for causing said unit operating means to record the character carried by said unit in response to receipt of said energy, and means responsive to an end-of-message signal for causing said record-medium-moving means to continue moving the record medium as long as there is any energy stored in one of the delay means.

2. A recording apparatus comprising an input circuit adapted to receive an unlimited succession of signals representing characters to be recorded, a row of record making units, each corresponding to a different one of said characters, means for supporting a record medium in close proximity to said row of units and parallel thereto, means responsive to the received signals for moving said record medium through said apparatus in a direction parallel to said row of units a distance equal to the space separating two adjacent record making units for each successive signal received, separate operating means for each unit for individually causing each of said units to record its character on said record medium in response to a signal received at said input circuit representing the character carried by said unit, and delay means for each unit included in said last mentioned means for delaying a unit operating means for a period of time sufficient for a point on said record medium to reach said unit from a predetermined point at the end of said row positioned in a direction opposite to the direction of movement of said record medium, in which each of the record making units comprises a normally deenergized light source and a transparency including an image of the character represented by said unit, means including said source for projecting an image of said transparency on said medium, when said source is energized, the separate operating means for individually causing each of said units to record its character comprising means controlled by the respective delay means for energizing the associated light source.

3. A recording apparatus, as defined in claim 2, in which the means for energizing each light source comprises means common to all the light sources for producing a train of voltage pulses at the rate of the incoming signals, and a coincidence gate in the energizing circuit of each light source, each gate being jointly controlled by the delay means for the associated light source and by said pulse-producing means.

4. A printer comprising an input circuit adapted to receive signals representing different characters to be printed, a row of type elements each corresponding to a different one of said characters, means for supporting a printing blank in close proximity to said row of type elements and parallel thereto, means for moving said printing blank through said printer in a direction parallel to said row of elements, means for individually supporting said elements for independent limited movement towards and away from said printing blank, separate means for moving each of said elements towards said printing blank in response to a signal received at said input circuit representing the character carried by said element, and delay means included in said last mentioned means for delaying the operation of a type element for a period of time sufficient for said printing blank to reach said element from a predetermined point at the end of said row in a direction opposite to the direction of movement of said printing blank, each delay means comprising means for storing energy received in response to a signal characterizing a type element, and means for releasing said energy after the printing blank is moved a predetermined distance from the predetermined point and for feeding said energy to the associated type-element-moving means, and means for operating said type-element-moving means in response to receipt of said energy, and means responsive to an end-of-message signal for causing the printing-blank-moving means to continue moving the printing blank as long as there is any energy stored in one of the delay means.

5. A printer comprising a plurality of type elements arranged equally spaced in a row and adapted for limited movement in the same direction transverse to the line of said row, means for moving a printing blank step-by-step in a direction of said row and parallel thereto but spaced therefrom, the distance moved at each step being equal to the spacing between elements, means for independently moving each type element towards said printing blank in response to a signal characteristic of that type element, and means associated with each type element for delaying the operation of the associated type-element-moving means after the signal for operating it has been received for a time corresponding to the time it takes said printing blank to move the required number of steps from a point preceding the first type element to the type element associated with said type-element-moving means, each delaying means comprising means for storing energy received in response to a signal characterizing a type element and means for releasing said energy after a predetermined number of steps of the printing blank and for feeding it to the associated type-element-moving means, and means for operating said type-element-moving means in response to the receipt of said energy, and means responsive to an end-of-message signal for causing the printing-blank-moving means to continue moving the printing blank step-by-step as long as there is any energy stored in one of the delaying means.

6. A printer comprising a plurality of type elements arranged equally spaced in a row and adapted for limited movement in the same direction transverse to the line of said row, means for moving a printing blank step-by-step in a direction of said row and parallel thereto but spaced therefrom, the distance moved at each step being equal to the spacing between elements, means for independently moving each type element towards said printing blank in response to a signal characteristic of that type element, and means associated with each type element for delaying the operation of the associated type-element-moving means after the signal for operating it has been received for a time corresponding to the time it takes said printing blank to move the required number of steps from a point preceding the first type element to the type element associated with said type-element-moving means, the means for independently moving each type element towards said printing blank comprising a bail common to the type elements and arranged parallel to said type elements but spaced therefrom, means for mounting said bail for limited movement towards and away from said type elements, resilient means for normally holding said bail away from said type elements, means responsive to signals characteristic of any type element for moving said bail towards said type elements, a plurality of fingers, there being one for each type element, each mounted adjacent its associated type element and arranged for independently limited movement into and out of the space between said associated type element and said bail, resilient means for normally holding said finger out of said space, and means responsive to a signal characteristic of said type element for moving said finger into said space.

7. A printer comprising a plurality of type elements arranged equally spaced in a row and adapted for limited movement in the same direction transverse to the line of said row, means for moving a printing blank step-by-step in a direction of said row and parallel thereto but spaced therefrom, the distance moved at each step being equal to the spacing between elements, means for independently moving each type element towards said printing blank in response to a signal characteristic of that type element, and means associated with each type element for delaying the operation of the associated type-element-moving means after the signal for operating it has been received for a time corresponding to the time it takes said printing blank to move the required number of steps from a point preceding the first type element to the type element associated with said type-element-moving means, each delaying means comprising a stepping pattern register having a number of elements corresponding to the number of steps the printing blank is required to take from a point preceding the first type element to the particular type element associated with said delaying means, means for charging the first element of said register in response to a signal representing the associated type element, means for causing said register to step each time a signal representing any type element is received, and means responsive to the receipt of the last signal for causing the stepping registers to continue stepping and the printing blank moving means to continue moving said printing blank step-by-step as long as the stepping register with the greatest number of steps has a charge in it.

8. A printer, as defined in claim 7, in which the means for moving the type elements independently towards the printing blank comprises a bail, common to all said type elements, mounted parallelly to the row of type elements and arranged for limited movement towards and away from said type elements, resilient means for normally maintaining said bail away from said elements, means for moving said bail towards said elements each time one of said registers steps, an operating finger for each type element independently mounted for limited movement into and out of the space between said bail and the associated type element, resilient means for normally maintaining said operating fingers out of said space, and means for moving an operating finger into the space between said type element and said bail when the stepping register associated with said type element steps to its last position.

9. A printer comprising a plurality of type elements arranged in a straight row and equally spaced along said row, means for mounting said elements for limited movement in a direction perpendicular to said row, means for supporting a printing blank adjacent said elements but spaced slightly therefrom, means for moving said printing blank step-by-step in a direction parallel to said row, the distance moved at each step being equal to the distance between type elements, an operating bail mounted in spaced relation to said type elements, means for moving said bail a predetermined distance towards said type elements between every two steps of said printing blank, an input circuit for receiving signals representing a message to be printed, a signal decoder connected to said input circuit having a separate output conductor for each of said type elements and adapted to produce a potential on an output conductor corresponding to a type element when a signal representing that type element is received by said input circuit, a plurality of stepping pattern registers, one connected to each output conductor of said signal decoder, each of said stepping pattern registers adapted to receive the potential delivered by the conductor to which it is connected and to be charged thereby and to produce an output after a number of steps corresponding to the number of steps required for said printing blank to travel from a predetermined point to the associated type element, means for causing all said registers to step as long as any register is in a charged condition, a plurality of type element operating fingers arranged in parallel relation to a straight row parallel to the row of said elements and adjacent said elements and said operating bail, there being one finger for each type element, means for flexibly mounting said fingers, each finger being arranged for independent limited movement into and out of the space between an associated type element and said operating bail, the arrangement of said type elements, said finger and said printing bail being such that movement of an operating finger into the space between its associated type element and said operating bail will permit said operating bail to move said associated type element against said printing blank when said operating bail moves in the direction of said type elements, separate means for each operating finger for moving it between its associated type element and said operating bail, and means connecting said stepping pattern registers respectively with said finger operating means, said finger operating means being respectively responsive to said stepping pattern registers.

References Cited in the file of this patent

UNITED STATES PATENTS

| | | |
|---|---|---|
| 2,692,551 | Potter | Oct. 26, 1954 |
| 2,811,102 | Devol | Oct. 29, 1957 |
| 2,858,536 | Johnston | Oct. 28, 1958 |